Feb. 20, 1934.    J. A. SPENCER    1,947,884
CONTROL
Filed Feb. 16, 1931    3 Sheets-Sheet 1

John A. Spencer,
Inventor,
Delos G. Haynes,
Attorney.

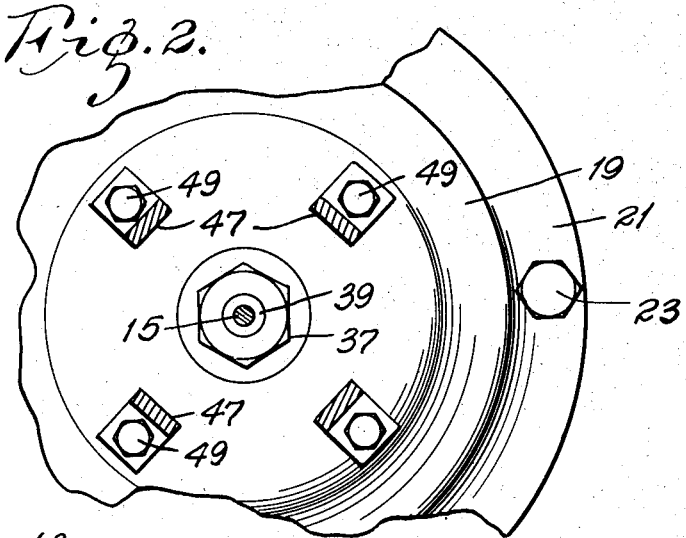
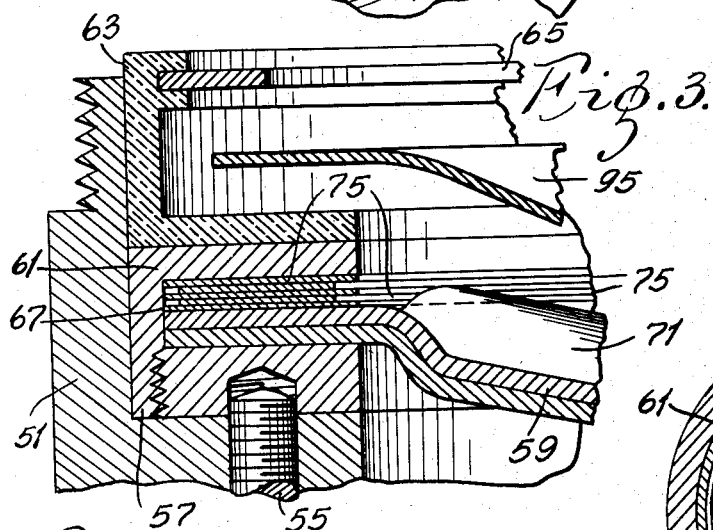
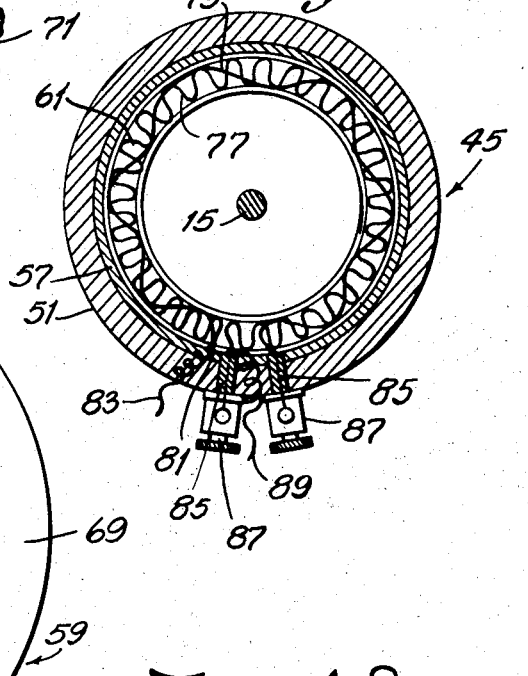
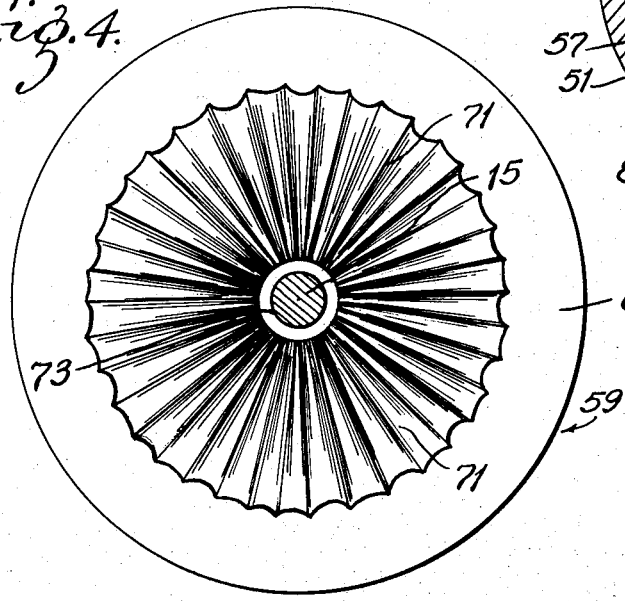

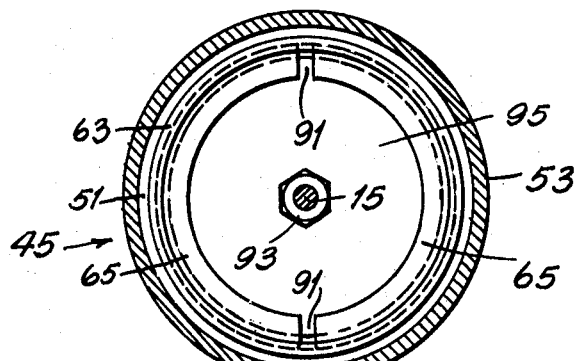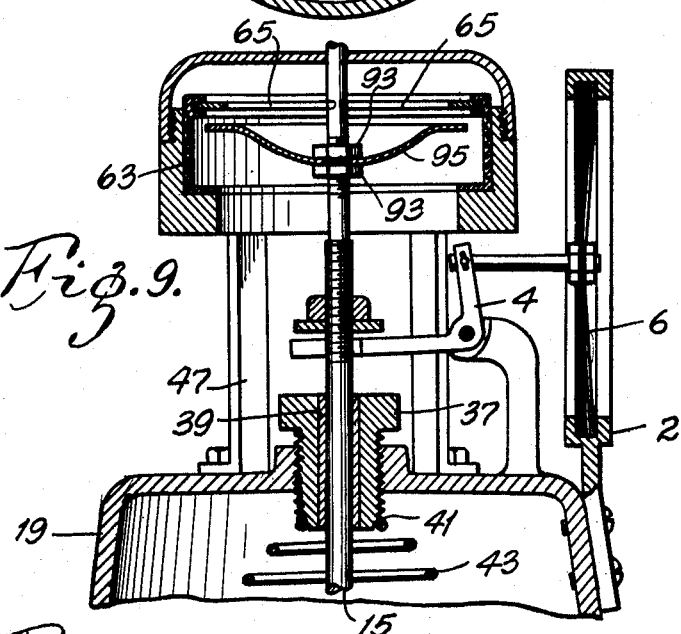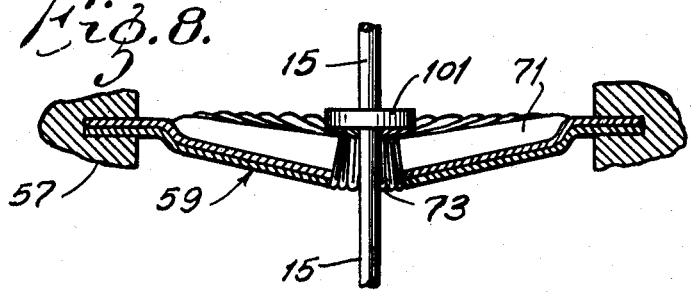

Patented Feb. 20, 1934

1,947,884

UNITED STATES PATENT OFFICE 1,947,884

CONTROL

John A. Spencer, Newtonville, Mass., assignor to General Plate Company, Attleboro, Mass., a corporation of Massachusetts Application February 16, 1931. Serial No. 516,043

4 Claims. (Cl. 236—68)

This invention relates to controls, and with regard to certain more specific features, to a combined temperature and pressure-regulated control for valves and the like.

Among the several objects of the invention may be noted the provision of a control of the class described which is adapted to operate under predetermined conditions of both temperature and pressure, so that when installed in a fluid system in connection with a temperature regulator of the usual type, the control will function to regulate pressure, the device regulating said fluid; the provision of a control of this class which is adapted to be maintained in either closed or open position so long as conditions exterior to the valve are maintained within certain ranges; the provision of apparatus of this class which operates quickly in response to requirements for changed positions of the operating parts thereof; the provision of such apparatus which shall not be overheated due to heating required for quick responses; and the provision of a combination in a single unit of pressure regulation with thermostatic control. Other objects will be in part obvious and in part pointed out hereinafter.

The invention accordingly comprises the elements and combinations of elements, features of construction and arrangements of parts, which will be exemplified in the structure hereinafter described, and the scope of the application of which will be indicated in the following claims.

In the accompanying drawings, in which are illustrated several of various possible embodiments of the invention, Fig. 1 is a cross section of a valve embodying the present invention;

Fig. 2 is a horizontal section taken substantially on line 2—2 of Fig. 1;

Fig. 3 is an enlarged fragmentary section of a thermostat portion of Fig. 1;

Fig. 4 is a horizontal section taken on line 4—4 of Fig. 1 but enlarged in size;

Fig. 5 is a diagrammatic section taken substantially on line 5—5 of Fig. 1 showing a heater arrangement;

Fig. 6 is a horizontal section taken substantially on line 6—6 of Fig. 1;

Fig. 8 is a fragmentary cross section illustrating a connection; and,

Fig. 9 is a detail showing an alternative form of mounting.

Similar reference characters indicate corresponding parts throughout the several views of the drawings.

Figure 1:
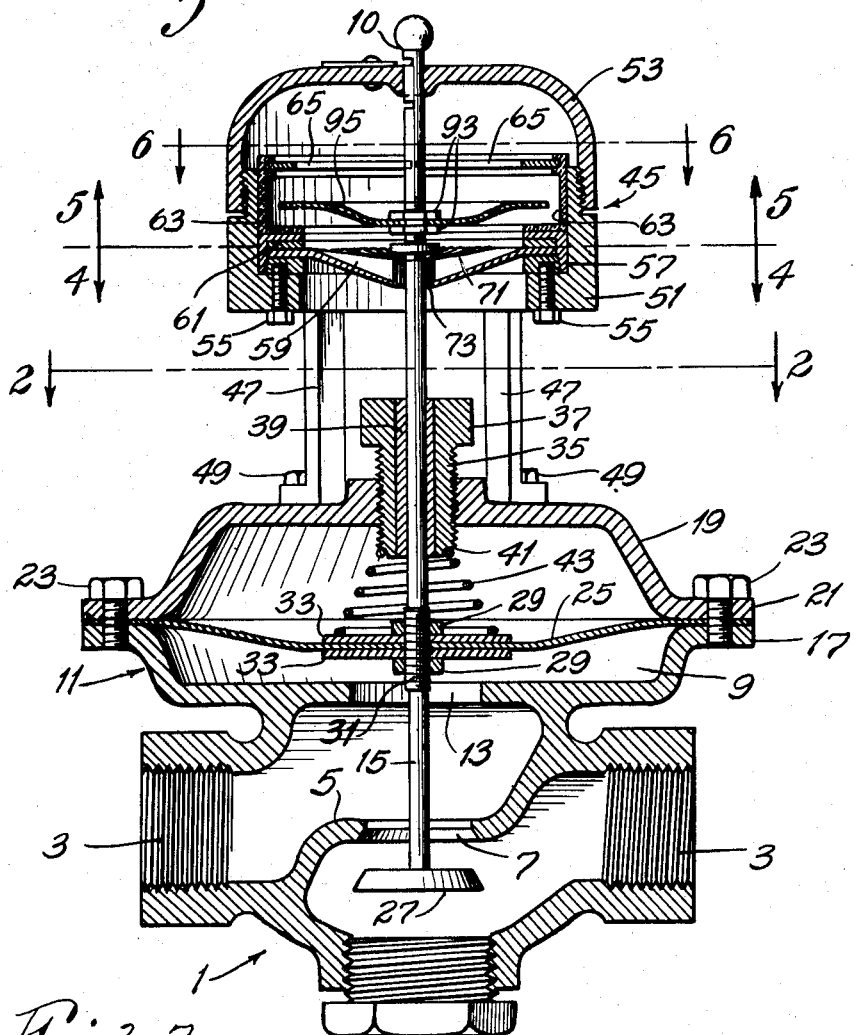

Referring now more particularly to Fig. 1, there is illustrated at numeral 1 a globe valve including threaded inlet and outlet portions 3, and a central partition 5 having a valve seat 7 therein. The upper portion of the valve 1 is extended to form the lower section 9 of a pressure diaphragm chamber 11. An opening 13 is disposed to permit communication between the chamber 11 and the valve 1, and also to permit the passage therethrough of a valve stem 15.

The portion 9 has formed around the outer edge thereof a flange 17. An upper section 19 having a flange 21 cooperating with the flange 17, completes the chamber 11. Fasteners 23 serve to hold the flanges 17 and 21 together and accordingly to secure the upper section 19 and the lower section 9 of the chamber 11 to complete said chamber.

Clamped between the flanges 17 and 21 is a pressure diaphragm 25, preferably formed of sheepskin or leather or other pliable, impervious material.

The valve stem 15 has affixed to the lower end thereof a valve closure head 27 which is adapted to cooperate with and close on the valve seat 7. The stem 15, after passing through the opening 13, is secured to the diaphragm 25 by means of a pair of nuts 29 engaging in a threaded portion 31 on said stem 15, and a pair of clamping washers 33. The relative arrangement of the stem 15, the nuts 29, the washers 33 and the diaphragm 25 will be apparent upon inspection of Fig. 1. In its normal position, the diaphragm 25 preferably is secured to the stem 15 in such position that the valve closure member 27 is removed from the seat 7, that is, the valve is open for the passage of fluid when the diaphragm 25 is in its normal position shown.

Centrally located in the top of the upper section 19 is a threaded bushing 35. The bushing 35 is provided with a head 37, which is preferably hexagonal or knurled or otherwise formed to permit vertical adjustment of said bushing 35 in said upper section 19. The central portion of the bushing 35 is provided with a bearing 39 which serves to mount the valve stem 15.

The lower end of the bushing 35 is shouldered as shown at numeral 41 to engage the small end of a conical spring 43. The large end of the spring 43 rests upon the upper washer 33 of the assembly which secures the diaphragm 25 to the stem 15. It will be seen that the adjustable bushing 35 with the spring 43 provides an adjustable means for regulating the pressure or tension of the diaphragm 35. In operation, the bushing 35 is adjusted to give the desired pressure in the outlet at the right.

Mounted on the top of the upper section 19, in spaced relationship thereto, is a thermostat switch assembly indicated generally by the numeral 45. A number of circumferentially arranged legs 47 and bolts or studs 49 serve to support the assembly 45 on said section 19. Generally speaking, the assembly 45 comprises a box or housing 51, from which the legs 47 depend, to which is threaded a removable cap portion 53, and in which is held, by means of screws 55, a thermostat mounting ring 57. The ring 57 has mounted therein a thermostat 59 and a heating element 61. Above the ring 57 is mounted an insulating ring 63 having contacting segments 65 secured thereto.

The construction of the mounting ring 57 will be more apparent upon inspection of Fig. 3.

It will be seen that the ring 57 has therein annular groove 67 which receives and securely holds a flat rim portion 69 of the thermostat 59 (shown in detail in Fig. 4) and the heating element 61. The thermostat 59 is preferably of the general type illustrated in my co-pending application, Serial Number 516,042, filed February 16, 1931, now Patent No. 1,895,591, granted January 31, 1933. Briefly described, this thermostat 59 comprises a disk of thermostatic metal such as is usually termed "bimetallic" or "composite metallic". The central portion of the thermostat 59 is preferably radially corrugated as at numeral 71, but the edge or rim portion 69 thereof is preferably flat or non-corrugated. The radially corrugated portion 71 has an originally formed concavity in one direction.

A thermostat of the type illustrated has the property upon its being brought to a certain temperature, of impulsively reversing the direction of its concavity. In other words, if the disk be originally considered concave, it becomes convex, or vice versa. The explanation of this phenomenon, as well as the advantages of having the flat rim 69, are disclosed in said co-pending application.

It is to be understood that types of thermostats other than the type illustrated in said application may with equal success be used in the present invention. For example, a thermostatic disk of the type shown in the Spencer Patent 1,448,240 might also be employed if the valve opening were small. In general, any thermostat which when supported at one region, under suitable temperature change, goes through a more or less sudden displacement of its central portion, is suitable for use in the present invention.

The thermostat 59, as used herein, has a central opening 73 to permit the passage of the valve stem 15, to be particularized hereinafter.

The heating element 61 is illustrated in more detail in Fig. 5. By reference to Figs. 3 and 5 it will be seen that said heating element 61 comprises a plurality of mica rings 75. The second and fourth of the rings 75 are preferably smaller than the first, third and fifth. On the second ring 75, or on the fourth ring, is wound a closely spaced relatively high resistance wire coil 77. On the fourth ring 75 or on the second ring if the coil 77 is on the fourth ring, is wound a relatively low resistance short wire coil 79. The coils 77 and 79 are preferably connected in series as illustrated at numeral 81 and a connecting wire 83 lead from the juncture of the coils 77 and 79. The free end of the coil 77 preferably passes through an insulated channel 85 in the ring 57 and casing 51, to a suitably insulated binding post or the like 87 the free end of the coil 79 likewise passes through an insulated channel to a similar binding post 87. In addition to the connection to the binding post 87, the free end of the coil 77 has connected thereto a lead wire 89, which passes to one of the contacting segments 65 as will be described hereinafter. It will be seen that the connections between the binding posts 87 include both the resistance coils 77 and 79 in series, while the leads 83 and 89 are connected only to the opposite ends of the high resistance coil 77.

The third or middle mica ring 75 serves to insulate from each other the coils 77 and 79. The first and fifth mica rings 75 insulate both of the coils 77 and 79 from the mounting ring 77.

Secured to the top of the ring 57 is the insulating ring 63 (see Fig. 3). The ring 63 is preferably made of fibre, rubber, bakelite, or other suitable insulating material. Mounted on top of the insulating rings 63 in position to be insulated from contact with the casing 51 are the contacting segments 65 (see also Fig. 6). The segments 65 are preferably substantially semi-circular, and are spaced from each other as at numeral 91, whereby they are electrically insulated. By means of a suitably insulated channel, the lead 83 is connected to one of the segments 65, and the lead 89 is connected to the other segment 65. It is thus seen that the respective segments 65 are connected to opposite ends of the high resistance 77.

Affixed to the upper end of the valve stem 15, by means of nuts 93, is a resilient contacting disk 95. The disk 95 is mounted on the stem 15 in such position that when the valve is closed said disk 95 completes an electrical circuit between the two contacted segments 65. This will be apparent by inspection of Fig. 1.

A method of permitting engagement between the thermostat 59 and the valve stem 15 is illustrated in Fig. 9 wherein the stem 15 has mounted thereon, a shoulder 101. The shoulder 101 is spaced from the opening 73 in the central portion of the thermostat 59 when the thermostat is snapped down. Thus, under these conditions the valve is free of the thermostat and rides on the diaphragm; hence pressure regulation by the diaphragm and spring 43 may take place.

Figure 7:
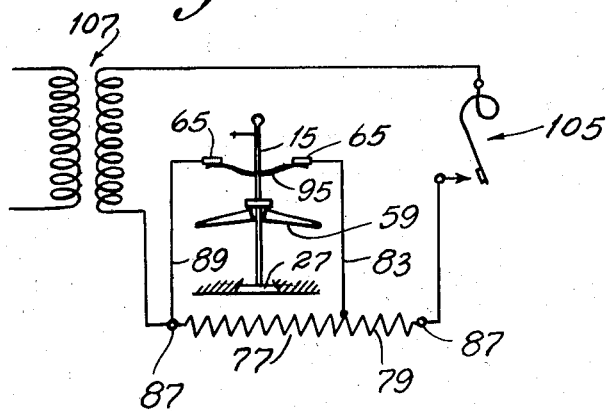
Fig. 7 is a circuit diagram.

The operation of the invention, considered as a whole, is as follows:

By reference to Fig. 7 it will be seen that the valve in use, is connected in series with a temperature control thermostat 105 and a source of electric current such as a transformer 107. The thermostat 105 may be of any contact-making and contact-breaking type, such as are ordinarily used in domestic heating systems.

In its normal, Fig. 1 position, the valve is open, allowing a regulated flow therethrough free of the thermostat but according to the setting of the spring 43. If the pressure in the system goes up, a pressure is exerted against the diaphragm 25 and as the pressure increases, the valve stem 15 is moved vertically upward until the closure member 27 throttles the valve 7, thus partially cutting off the flow through the valve. This constitutes operation of the invention under pressure conditions.

The thermostat 59, in its normal open position, is dished downwardly, and the valve thus open. After the exterior temperature cools to a predetermined lower limit, the elements being positioned as in Fig. 7, the thermostat 105 makes contact and current flows in the electrical circuit. The contacting disk 95 is in contact with the segment 65 at this time and resistance 77 is shunted out of the circuit and the entire current flows through the resistance 79. Because of the partial resistance 79, the current is large and a quick, intensified heating action is obtained. This intensified heat in the heating element almost immediately causes the thermostat 59 to snap to its downward dished position, thereby moving the valve stem 15 to open the valve to permit the flow of liquid or gas or the like to the heater (not shown).

As the valve stem 15 moves downward, it carries the contacted disk 91 out of contact with the segments 65 thereby breaking the shunt across the high resistance 77 and permitting current to flow through the combined resistances 77 and 79 in series. The resistance thus introduced cuts down the current and cuts down the heating effect. The heating effect during the time that current flows through the combined resistances 77 and 79 is preferably predetermined to the extent that it will maintain the thermostat 59 in its hot position without allowing it to snap back prematurely and close the valve, but without the expenditure of any more current than is necessary. After the surroundings have become sufficiently warm, the thermostat 105 again opens, thereby breaking the electrical circuit and cutting off the flow of current through the combined resistances 77 and 79. The heating effect on the thermostat 59 is thus removed and said thermostat resumes its upward position, thereby carrying the valve stem 15 upward and thus closing the valve.

In Fig. 9 is shown a mounting 2 for a thermostatic member 6 with a motion multiplying linkage 4 between the thermostatic member 6 and the valve stem 15, whereby advantage may be taken of the thermostatic members having lower movement characteristics. Otherwise the features are the same as already described. The shunting switch elements are not shown in Fig. 9, being enclosed. The heating elements per se are mounted at the rim of the element 6, as before described.

The thermostat 59 in effect operates as a relay for the thermostat 105, positively translating the electrical current conveyed from said thermostat 105 into mechanical movement for the operation of the valve.

It is to be understood that the force exerted by the snapping of the thermostat 59 is sufficient to overcome the reaction of the spring. It is also to be noted that the pressure regulating diaphragm 25 is operated independently of the thermostat 59 and may be operated manually by the lockable member 10.

It is also to be understood that the primary heating system fed by the fluid lines in communication at 3 with the valve 1 may be of any type.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A control comprising a member adapted to be moved to either of two positions, a snap-acting thermostat adapted upon being heated and cooled to effect said positions of said member, an electric circuit including heating means, comprising resistances in series, adapted to heat said thermostat and means for automatically shorting out one of said resistances whereby in one position of said member fast heating of the thermostat takes place to cause said thermostat to completely throw, and in the thrown position of the thermostat automatically to reintroduce the shorted-out resistance, thereby to cause slower continuous heating to definitely maintain the full throw.

2. A control comprising a member adapted to be moved to either of two positions, a snap-acting thermostat adapted upon being heated and cooled to effect said positions of said member, an electric circuit including heating means, comprising resistances in series, adapted to heat said thermostat and means for automatically shorting out one of said resistances, whereby in one position of said member fast heating of the thermostat takes place to cause said thermostat to completely throw, and in the thrown position of the thermostat automatically to reinforce the shorted-out resistance, thereby to cause slower continuous heating to definitely maintain the full throw and a second thermostat in said circuit directly responsive to the temperature to be regulated.

3. A pressure-temperature relief valve comprising a valve casing, a valve seat therein, a valve closure member, and a valve stem, said valve closure member being mounted on said valve stem, a flexible diaphragm connected to said valve stem adapted to regulate said valve stem and a snap-acting disc thermostat reacting on said valve stem to open and shut said valve under conditions of temperature change of the thermostat, said thermostat having in operative relationship thereto a heating element, and said heating element being connected in series with a source of current supply and a second temperature controlled thermostat.

4. Means for actuating a thermostat comprising a pair of resistances adapted to be positioned in heating relationsip to said thermostat, one of said resistances being relatively high with respect to the other of said resistances, said resistances being connected in series and to a source of current supply, means associated with said thermostat for shorting resistance out of circuit when said thermostat is in one position.

JOHN A. SPENCER.